(12) United States Patent
Eschbach

(10) Patent No.: US 6,425,603 B1
(45) Date of Patent: Jul. 30, 2002

(54) GAS BAG RESTRAINT SYSTEM

(75) Inventor: Ernst Eschbach, Dachau (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/560,991

(22) Filed: Apr. 28, 2000

(30) Foreign Application Priority Data

Apr. 29, 1999 (DE) ..................................... 299 07 618 U

(51) Int. Cl.[7] ............................................... B60R 21/16
(52) U.S. Cl. .................... 280/743.2; 280/728.1
(58) Field of Search ........................ 280/743.2, 743.1, 280/748, 728.1; 180/271

(56) References Cited

U.S. PATENT DOCUMENTS 5,762,367 A * 6/1998 Wolanin ................... 280/742.2
5,967,549 A * 10/1999 Allen et al.
6,053,529 A * 4/2000 Frusti et al.
6,186,537 B1 * 2/2001 Breed et al.
6,189,928 B1 * 2/2001 Sommer et al. ......... 280/743.2

FOREIGN PATENT DOCUMENTS

| DE | 4142326 | 6/1993 |
| DE | 4440258 | 5/1996 |
| JP | 3258636 | 11/1999 |

* cited by examiner

Primary Examiner—Eric Culbreth
Assistant Examiner—Christopher Bottorff
(74) Attorney, Agent, or Firm—Tarolli, Sundheim, Covell, Tummino & Szabo L.L.P.

(57) ABSTRACT

The invention relates to a gas bag restraint system for vehicle occupants which comprises a gas bag having a maximum unfolding distance and a vehicle seat associated with the system. The gas bag restraint system further comprises a gas bag delimiting device which delimits the maximum unfolding distance of the gas bag towards the occupant as a function of a position of the vehicle seat.

11 Claims, 1 Drawing Sheet

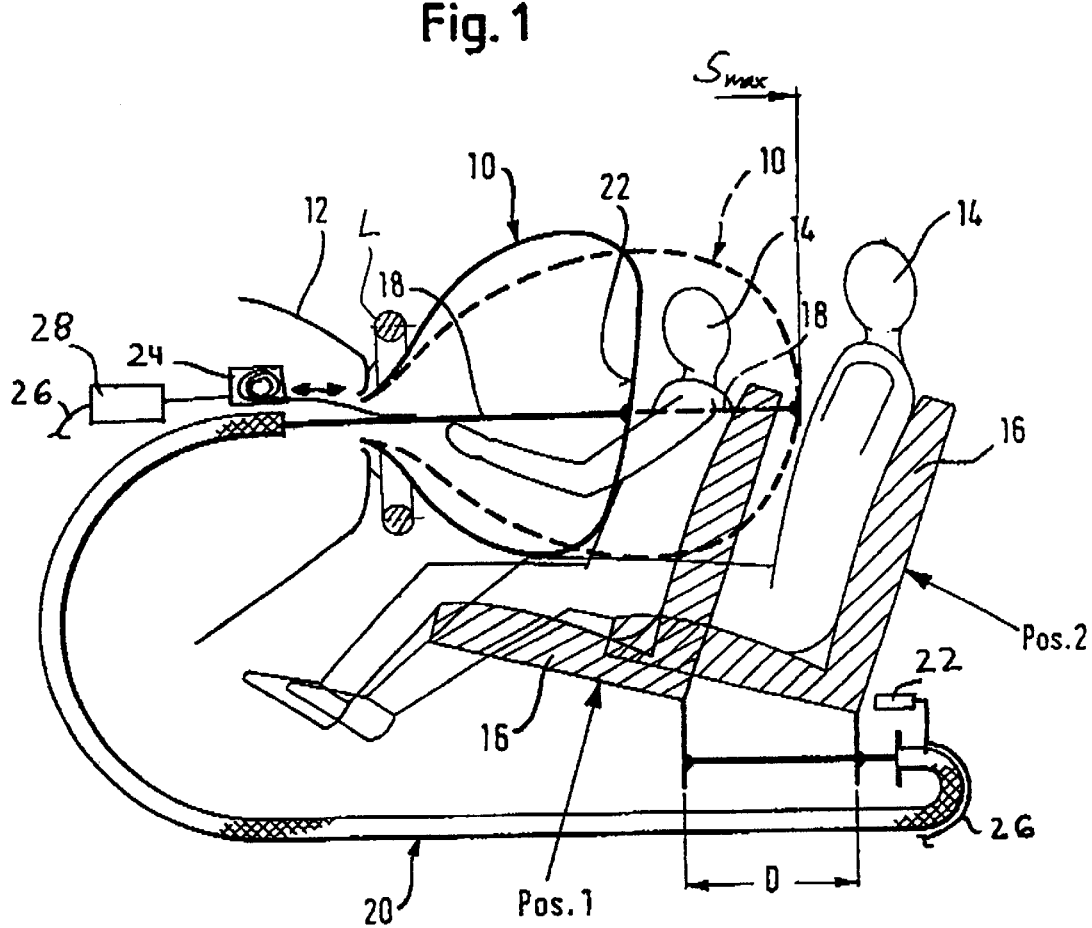

GAS BAG RESTRAINT SYSTEM

TECHNICAL FIELD

The invention relates to a gas bag restraint system for vehicle occupants.

BACKGROUND OF THE INVENTION

With the unfolding of the gas bag in the case of restraint, the latter penetrates a specific distance into the occupants' compartment, in order to intercept a vehicle occupant and keep him from injuries by contact with the steering wheel or, in the case of the passenger, by contact with the dashboard. In conventional restraint systems of this type, this distance is coordinated such that a vehicle occupant of average size is protected optimally by the gas bag in the case of restraint. Provision is not made to alter this distance which the gas bag penetrates into the interior of the vehicle. A disadvantage here is that a vehicle occupant of smaller body size than the assumed average size, who in most cases sits closer to the steering wheel or to the dashboard than a larger occupant, already comes into contact with the gas bag in the case of restraint when the latter still has a high unfolding speed. In this case, the gas bag can not provide its optimum restraining effect and the occupant can even be injured by the unfolding gas bag. Likewise, it can occur that for an excessively large occupant of the vehicle, who sits further back in the vehicle than a person of average size, possibly the restraining effect of the gas bag is no longer sufficient. Accordingly, the restraining effect is not optimal when a vehicle occupant is in a position which lies further to the front or further to the rear than that of a person of average size.

From the DE 298 05 217 a device is known with which the form of the gas bag and in particular the unfolding distance in the unfolded state can be influenced by the length of limiting straps running in the gas bag, the length being varied by a sensor-controlled winding device. In the case of restraint, for this, the position of the vehicle occupant is picked up by a sensor and the length of the limiting straps is accordingly limited. As the position of the vehicle occupant is only established during the unfolding of the gas bag and only then an adjustment of the winding device can take place, sensors are necessary which act very quickly and exactly. Also, high requirements are set for the winding device, as the controlling of the expansion of the gas bag must take place within milliseconds. An additional disadvantage results from the space requirement of this winding device, in particular for use for driver's airbags arranged in the steering wheel.

BRIEF SUMMARY OF THE INVENTION

The invention presented here has the problem of providing a gas bag delimiting device which for each position of the vehicle occupant ensures an optimum restraining effect by the gas bag and through which the unfolding length of the gas bag is adjustable in a simple manner. This is achieved in a gas bag restraint system which comprises a gas bag having a maximum unfolding distance and a vehicle seat associated with the system. The gas bag restraint system further comprises a gas bag delimiting device which delimits the maximum unfolding distance of the gas bag towards the occupant as a function of a position of the vehicle seat. By picking up the position of the vehicle seat, the unfolding distance which the gas bag projects in the case of restraint into the interior of the vehicle, is set as a function of the position of the seat. Thus, the gas bag unfolds in the case of restraint precisely so far towards the vehicle occupant that the latter receives an optimum restraining effect. High contact speeds of the gas bag with the vehicle occupant are avoided without costly devices having to be provided in order to make adjustments to the delimiting device during the unfolding of the gas bag. In addition, the position of the vehicle seat is a parameter, simple to detect, for controlling the gas bag delimiting device.

In an advantageous embodiment of the invention, the gas bag delimiting device is coupled mechanically or electrically with the vehicle seat which is associated with the system. This permits a direct mechanical and/or electronic adjustment of the maximum unfolding distance of the gas bag, as a function of the respective position of the vehicle seat.

A mechanical coupling between the gas bag delimiting device and the vehicle seat is in particular advantageous. It permits the delimiting of the unfolding of the gas bag in a simple and favorably-priced manner.

In an embodiment, provision is further made that the gas bag delimiting device has at least one adjustable limiting strap which is connected with the gas bag wall. The length or the position of this limiting strap can be adjusted as a function of the seat position. In this way, the maximum unfolding distance of the gas bag can be regulated in a simple manner. In particular, it is advantageous if the limiting strap is arranged inside the gas bag and extends towards the dashboard or the steering wheel. Thereby also no danger exists that the limiting strap becomes hooked for instance on the opening arising on unfolding of the gas bag in the instrument support or in the steering wheel or otherwise disturbs the unfolding of the gas bag.

The coupling of limiting strap and vehicle seat consists for example of a Bowden cable system. In this way, the length of the limiting strap section which extends in the gas bag can be adjusted directly by way of the position of the seat.

Advantageously, this Bowden cable runs from the seat towards the dashboard and behind the latter to the opening in the instrument support or in the steering wheel which arises on unfolding of the gas bag. Thus the gas bag delimiting;device can be mounted together with the gas bag restraint system and can be placed completely behind the lining.

According to a variant of the invention, in addition to the seat position, the position of the vehicle occupant can be directly monitored and can also be used for adjusting the length of the limiting strap section running in the gas bag. In this way, too high a contact speed of the gas bag with the occupant can be avoided even when the upper body of the occupant is situated very close to the steering wheel or to the instrument panel.

BRIEF DESCRIPTION OF THE DRAWING

In FIG. 1 an embodiment of a gas bag restraint system for vehicle occupants according to the invention is shown schematically in side view.

DETAILED DESCRIPTION OF THE PREFERRED EMBODIMENT

A gas bag 10 is part of a restraint system and is accommodated in the steering wheel, or in the instrument panel and dashboard 12, respectively. The steering wheel is shown schematically and designated by "L" in FIG. 1.

A small or large vehicle occupant 14 and 14', respectively, sits on a vehicle seat 16 and in the case of restraint is in contact with the unfolded gas bag 10 which is embodied here as a front gas bag.

Inside this gas bag 10, limiting straps 18 are provided, which are fastened at one end of a Bowden cable 20, the other end of which is coupled with the vehicle seat 16. The limiting straps 18 are fastened in particular to the section of the gas bag inner wall 22 with which the occupant 14, 14' comes into contact.

Advantageously the Bowden cable runs from the seat towards the instrument panel or dashboard 12 and behind the latter upwards to the gas bag arrangement accommodated in the instrument panel 12 or in the steering wheel. In the case of restraint, through the unfolding of the gas bag 10 an opening is created in the instrument panel 12 or in the steering wheel, so that a direct linear connection exists between the Bowden cable 20 and the limiting straps 18.

The limiting straps 18 together with the Bowden cable 20 form a gas bag delimiting device which variably delimits the maximum unfolding distance of the gas bag towards the occupant as a function of the seat position, or, as is subsequently further explained, in addition as a function of the position of the upper body of the occupant. The maximum unfolding distance of the gas bag is designated by $S_{max}$ in FIG. 1.

A vehicle occupant 14 with small body size normally sets the distance of the vehicle seat 16 to the steering wheel 12 (Pos. 1) smaller than a large vehicle occupant 14' (Pos. 2). The difference in the distance of the seat position is designated by D.

As a function of how far the seat 16 is pushed forward or backward, the limiting straps 18 are also pushed by the Bowden cable 20, coupled with the seat 16, to a greater or lesser extent into the steering wheel or the instrument panel 12. As the limiting straps 18 delimit the maximum unfolding distance of the gas bag towards the occupant, via the Bowden cable the length of the section of the limiting straps 18 situated in the gas bag 10 is altered and coordinated with the seat position. In the case of a small vehicle occupant 14, who pushes his seat 16 further forward, the length of the limiting strap section inside the gas bag is very short. The unfolding distance of the gas bag and the gas bag depth thereby also become less, and the gas bag can not strike onto the occupant at high speed. The gas bag also has a slightly smaller volume than in the case of the large occupant 14'. With the small occupant 14, the gas bag is illustrated by continuous lines in FIG. 1.

If a large vehicle occupant 14' pushes the seat 16 into the rear position 2, through the Bowden cable the limiting strap section is automatically extended inside the gas bag 10, so that the gas bag 10 can unfold to a different geometry (shown in dotted lines) with a different gas bag depth than with a small vehicle occupant 14. The gas bag thus also guarantees to the large occupant an optimum restraining effect.

An electronic coupling is also conceivable between the position of the vehicle seat 16 and the limiting strap position, the seat position being detected by a sensor 22 and a mechanism 24 for example in the form of a step motor drive 24 arranged for example behind the instrument panel and controlling the position or the length of the limiting straps 18 by winding up or unwinding the limiting straps. The sensor 22 and the drive 24 are electrically coupled via wires 26 and a control unit 28.

It is likewise conceivable to detect the position of the vehicle occupant 14, 14' directly, independently of the position of the vehicle seat 16, by means of sensors (not illustrated) arranged inside the vehicle, and to adapt the position or the length of the limiting strap 18, for example with each alteration, electronically to the respective distance of the vehicle occupant 14, 14' from the gas bag arrangement. This is advantageous for example in order to avoid injuries by the gas bag, when a vehicle occupant 14, 14' bends forward, in order for example to reach the radio or the glove compartment and in this situation an accident triggers the unfolding of the gas bag 10. The seat adjustment in this case determines the coarse adjustment and the occupant position determines the fine adjustment of the belt delimiting device.

What is claimed is:

1. A gas bag restraint system for a vehicle occupant, comprising:

a gas bag having a maximum unfolding distance, a vehicle seat associated with said system, and a gas bag delimiting device which delimits said maximum unfolding distance of said gas bag towards said occupant as a function of a position of said vehicle seat, said gas bag having a gas bag wall and said gas bag delimiting device having at least one adjustable limiting strap connected with said gas bag wall which allows adjustment of the distance between said gas bag wall and said occupant, said gas bag delimiting device being coupled to said vehicle seat so that said limiting strap, prior to a deployment of said gas bag, being fixedly displaced by displacement of said vehicle seat.

2. The gas bag restraint system according to claim 1, wherein said gas bag delimiting device is coupled electrically with said vehicle seat which is associated with said system.

3. The gas bag restraint system according to claim 1, wherein a mechanical coupling is present between said gas bag delimiting device and said vehicle seat.

4. The gas bag restraint system according to claim 3, wherein said limiting strap is coupled mechanically with said vehicle seat.

5. The gas bag restraint system according to claim 1, wherein a dashboard is provided and said limiting strap is arranged inside said gas bag and extends towards said dashboard.

6. The gas bag restraint system according to claim 1, wherein a steering wheel is provided and said limiting strap is arranged inside said gas bag and extends towards said steering wheel.

7. The gas bag restraint system according to claim 1, wherein said gas bag delimiting device delimits said maximum unfolding distance of said gas bag as a function of a sitting position of said occupant.

8. The gas bag restraint system according to claim 1, wherein said gas bag is a front gas bag.

9. A gas bag restraint system for a vehicle occupant, comprising:

a gas bag having a maximum unfolding distance, a vehicle seat associated with said system, a gas bag delimiting device which delimits said maximum unfolding distance of said gas bag towards said occupant as a function of a-position of said vehicle seat, a steering wheel, and a Bowden cable system, said gas bag having a gas bag wall and said gas bag delimiting device having at least one adjustable limiting strap connected with said gas bag wall, said limiting strap being arranged inside said gas bag and extending towards said steering wheel, said Bowden cable system establishing a mechanical coupling between said limiting strap and said vehicle seat.

10. A gas bag restraint system for a vehicle occupant, said system comprising:

a gas bag having a maximum unfolding distance, a vehicle seat and a steering wheel associated with said system, a gas bag delimiting device which delimits said maximum unfolding distance of said gas bag towards said occupant as a function of a position of said vehicle seat, and a Bowden cable system, said gas bag having a gas bag wall and said gas bag delimiting device having at least one adjustable limiting strap arranged inside said gas bag wall and extending towards said steering wheel and connected with said gas bag wall, said Bowden cable system comprising at least one Bowden cable extending from said vehicle seat towards said steering wheel and from behind the latter to an opening which opens up in said steering wheel on unfolding of said gas bag.

11. A gas bag restraint system for a vehicle occupant, said system comprising:

a gas bag having a maximum unfolding distance, a vehicle seat and a steering wheel associated with said system, a gas bag delimiting device which delimits said maximum unfolding distance of said gas bag towards said occupant as a function of a position of said vehicle seat, and a Bowden cable system, said gas bag having a gas bag wall and said gas bag delimiting device having at least one adjustable limiting strap arranged inside said gas bag wall, extending towards said dashboard and connected with said gas bag wall, said Bowden cable system comprising at least one Bowden cable extending from said vehicle seat towards said dashboard and from behind the latter to an opening which opens up in said dashboard on unfolding of said gas bag.

* * * * *